US010872246B2

United States Patent
Sattar et al.

(10) Patent No.: US 10,872,246 B2
(45) Date of Patent: Dec. 22, 2020

(54) VEHICLE LANE DETECTION SYSTEM

(71) Applicant: Regents of the University of Minnesota, Minneapolis, MN (US)

(72) Inventors: Junaed Sattar, Minneapolis, MN (US); Jiawei Mo, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 80 days.

(21) Appl. No.: 16/124,502

(22) Filed: Sep. 7, 2018

(65) Prior Publication Data

US 2019/0073542 A1  Mar. 7, 2019

Related U.S. Application Data

(60) Provisional application No. 62/555,583, filed on Sep. 7, 2017.

(51) Int. Cl.
| | |
|---|---|
| *G06K 9/00* | (2006.01) |
| *G06T 19/20* | (2011.01) |
| *G06T 7/70* | (2017.01) |
| *G06T 7/73* | (2017.01) |

(52) U.S. Cl.
CPC ............ *G06K 9/00798* (2013.01); *G06T 7/70* (2017.01); *G06T 7/74* (2017.01); *G06T 19/20* (2013.01); *G06T 2207/10024* (2013.01); *G06T 2207/30256* (2013.01)

(58) Field of Classification Search
CPC ................ G06K 9/00798; G06T 19/20; G06T 2207/10024; G06T 2207/30256; G06T 7/70; G06T 7/74
See application file for complete search history.

(56) References Cited

U.S. PATENT DOCUMENTS

| | | | |
|---|---|---|---|
| 2010/0097458 A1* | 4/2010 | Zhang ................ | G06K 9/00798 348/119 |
| 2015/0070470 A1* | 3/2015 | McMurrough ......... | G06F 3/013 348/46 |
| 2015/0086080 A1* | 3/2015 | Stein ................... | G06K 9/00798 382/104 |
| 2018/0012370 A1* | 1/2018 | Aghamohammadi .. | G01S 17/89 |
| 2018/0045519 A1* | 2/2018 | Ghadiok .............. | G05D 1/0246 |

(Continued)

OTHER PUBLICATIONS

"Traffic Safety Facts—2009 Data: Speeding," U.S. Department of Transportation, National Highway Traffic Safety Administration, NHTSA's National Center for Statistics and Analysis, May 2010, 6 pp.

(Continued)

*Primary Examiner* — Xin Jia
(74) *Attorney, Agent, or Firm* — Shumaker & Sieffert, P.A.

(57) ABSTRACT

In one example, a computing system is configured to obtain orientation data describing an orientation of the camera and geolocation data describing a location of the camera. The computing system is further configured to select, from one or more candidate images from an image database and based at least on the orientation data and the geolocation data, a best-matched image for a current image captured by the camera. The computing system is also configured to determine a location of a vehicle lane in the current image based on at least one lane marker visible in the best-matched image and output at least one indication of the location of the vehicle lane.

20 Claims, 7 Drawing Sheets

(56) References Cited

U.S. PATENT DOCUMENTS

| | | | |
|---|---|---|---|
| 2019/0017819 A1* | 1/2019 | Ohara | H04N 5/23296 |
| 2019/0154451 A1* | 5/2019 | Nystrom | B60W 40/06 |

OTHER PUBLICATIONS

"Subaru Eyesight—Driver Assist Technology," Subaru, accessed from https://www.subaru.com/engineering/eyesight.html, accessed on Jun. 14, 2019, 7 pp.

Bertozzi et al., "GOLD: A Parallel Real-Time Stereo Vision System for Generic Obstacle and Lane Detection," IEEE Transactions on Image Processing, vol. 7, No. 1, Jan. 1998, 20 pp.

Borkar et al., "Robust Lane Detection and Tracking with Ransac and Kalman Filter," Proceedings of the International Conference on Image Processing, ICIP, IEEE, Nov. 7-10, 2009, 4 pp.

Nedevschi et al., "3D Lane Detection System Based on Stereovision," IEEE Intelligent Transportation Systems Conference, 7th Proceedings, IEEE, Oct. 3-6, 2004, 6 pp.

Wang et al., "Lane Detection Using Catmull-Rom Spline," IEEE International Conference on Intelligent Vehicles, Applicant points out, in accordance with MPEP 609.04(a), that the year of publication, 1998, is sufficiently earlier than the effective U.S. filing date, so that the particular month of publication is not in issue, 7 pp.

Kluge et al., "Explicit Models for Robot Road Following," Vision and Navigation, The Springer International Series in Engineering and Computer Science, The Carnegie Mellon Navlab, Applicant points out, in accordance with MPEP 609.04(a), that the year of publication, 1990, is sufficiently earlier than the effective U.S. filing date, so that the particular month of publication is not in issue, 7 pp.

Chiu et al., "Lane Detection using Color-Based Segmentation," IEEE Proceedings, Intelligent Vehicles Symposium, Jun. 6-8, 2005, 6 pp.

Gonzalez et al., "Lane Detection Using Histogram-Based Segmentation and Decision Trees," Conference Proceedings 2000 IEEE Intelligent Transporation Systems, Oct. 1-3, 2000, 6 pp.

Takahashi et al., "Rear View Lane Detection by Wide Angle Camera," IEEE, Symposium in Intelligent Vehicle Symposium, vol. 1, Applicant points out, in accordance with MPEP 609.04(a), that the year of publication, 2002, is sufficiently earlier than the effective U.S. filing date, so that the particular month of publication is not in issue, 6 pp.

Thrun, "Toward Robotic Cars," Communications of the ACM, vol. 53, No. 4, Apr. 2010, 8 pp.

Wang et al., "Driver Fatigue Detection: A Survey," Proceedings of the 6th World Congress on Intelligent Control and Automation, Jun. 21-33, 2006, 5 pp.

Canny, "A Computational Approach to Edge Detection," IEEE Transactions on Patten Analysis and Machine Intelligence, vol. 8, No. 6, Nov. 1986, 20 pp.

Harris et al., "A Combined Corner and Edge Detector," In Proceedings of Fourth Alvey Vision Conference, vol. 15, Applicant points out, in accordance with MPEP 609.04(a), that the year of publication, 1988, is sufficiently earlier than the effective U.S. filing date, so that the particular month of publication is not in issue, 6 pp.

Kluge et al., "A Deformable-Template Approach to Lane Detection," IEEE Proceedings of the Intelligent Vehicles Symposium, Oct. 1995, 7 pp.

Hartley et al., "Multiple View Geometry in Computer Vision—Second Edition," Cambridge University Press, Mar. 2004, 673 pp.

Rublee et al., "ORB: an efficient alternative to SIFT or SURF," Proceeding in ICCV '11 Proceedings of the 2011 International Conference on Computer Vision, Nov. 6-13, 2011, 8 pp.

Evangelidis et al., "Parametric Image Alignment Using Enhanced Correlation Coefficient Maximization," IEEE Transactions on Pattern Analysis and Machine Intelligence, vol. 30, No. 10, Oct. 2008, 8 pp.

Kim, "Robust Lane Detection and Tracking in Challenging Scenarios," IEEE Transactions on Intelligent Transportation Systems, vol. 9, No. 1, Mar. 2008, 12 pp.

Fischler et al., "Random Sample Consensus: A Paradigm for model Fitting with Applications to Image Analysis and Automated Cartography," Communications of the ACM, vol. 24, No. 6, Jun. 1981, 15 pp.

"Open MP Application Program Interface—Version 3," Architecture Review Board, May 2008, 326 pp.

Szeliski et al., "Image Alignment and Stitching: A Tutorial," Foundations and Trends in Computer Graphics and Vision, vol. 2, No. 1, Jan. 2006, 105 pp.

Wang et al., "Lane detection and tracking using B-Snake," Image and Vision Computer, vol. 22, Oct. 2003, 12 pp.

Thorpe et al., "Vision and Navigation for the Carnegie-Mellon Navlab," IEEE Transactions on Pattern Analysis and Machine Intelligence, vol. 10, No. 3, May 1988, 12 pp.

Hillel et al., "Recent progress in road and lane detection: a survey," Machine Vision and Applications, Springer, Feb. 7, 2012, 19 pp.

\* cited by examiner

VEHICLE LANE DETECTION SYSTEM

This application claims the benefit of U.S. Provisional Application No. 62/555,583, filed Sep. 7, 2017, which is incorporated herein by reference in its entirety.

TECHNICAL FIELD

The disclosure relates to vehicle navigation systems and, more particularly, to automatically detecting vehicle lanes with vehicle navigation systems.

BACKGROUND

Recent advances in affordable sensing and computing technologies have given new impetus toward commercialization of a wide variety of intelligent technologies. A major consumer-targeted application has focused on increasing autonomy in transportation systems, the most prominent of which is the area of self-driving cars. In addition to fully-autonomous commercial vehicles, automobile manufacturers are equipping their vehicles with semi-autonomous assistive technologies relating to safety features. Some example features include lane assist, blind-spot detection, radar-assisted braking, and visual collision-avoidance. Those technologies that rely on visible-spectrum cameras as their sensors are often low-cost and low-power. However, these features require adequate lighting and an unobscured view in order to function properly. Due to these limitations, such features are often inoperable for nighttime driving and driving during inclement weather.

SUMMARY

In general, this disclosure describes techniques for robustly detecting a vehicle lane in an image of a visual scene by matching the image to an alternate image of a similar visual scene. For example, a system that applies the described techniques uses the vehicle's location data to locate one or more alternate images of the road ahead from an available "road-view" database. Once these one or more images are acquired, a visual lane-detection algorithm is applied to find the lane markers. Subsequently, visual feature matching is then applied to find corresponding image feature points between the "current" image and the alternate one or more "database" images (which were acquired at some point in the past during better visibility conditions) to determine an approximate location of the lane in the current image, even under zero or otherwise limited lane visibility. In some examples, the system may further project lane markers for the detected lane onto the current image for display, at a display device, to a user. In some examples implementations, a mobile application captures a variety of data from a device mounted on (or even outside) the vehicle.

The techniques may provide one or more technical advantages. As one example, the feature-matching techniques may improve the robustness of lane detection, accurate pose detection, and robust methods to relate the past image with the live frame. As another example, the techniques may provide a solution usable on a smartphone mounted on the vehicle windshield or dashboard, for instance, to provide lane departure warnings in extreme cases. The techniques may provide safety recommendations under the current driving conditions based on visual, location, and acceleration data and based on the approximate location of the lane in the current image, as determined by the system. The technical advantages may result in improved driver safety.

In one example, a vehicle lane detection system comprises a camera configured to obtain a current image; an orientation sensor configured to obtain orientation data describing an orientation of the camera; a geolocation sensor configured to obtain geolocation data describing a location of the camera; and at least one processor configured to: obtain one or more candidate images from an image database based at least one of the geolocation data and the orientation data; select a best-matched image for the current image from the one or more candidate images; determine a location of a vehicle lane in the current image based on at least one lane marker visible in the best-matched image; and output at least one indication of the location of the vehicle lane.

In another example, a method of vehicle lane detection comprises obtaining, by a computing system, orientation data describing an orientation of the camera and geolocation data describing a location of the camera; selecting, from one or more candidate images from an image database and based at least on the orientation data and the geolocation data, a best-matched image for a current image captured by the camera; determining a location of a vehicle lane in the current image based on at least one lane marker visible in the best-matched image; and outputting, by the computing system, at least one indication of the location of the vehicle lane.

In another example, a non-transitory computer readable storage medium has instructions stored thereon that, when executed by at least one processor, cause the at least one processor to obtain orientation data describing an orientation of the camera and geolocation data describing a location of the camera; select, from one or more candidate images from an image database and based at least on the orientation data and the geolocation data, a best-matched image for a current image captured by the camera; determine a location of a vehicle lane in the current image based on at least one lane marker visible in the best-matched image; and output at least one indication of the location of the vehicle lane.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

In general, techniques are described for a robust lane detection and/or tracking system for assisted and autonomous operation, particularly under poor visibility. Autonomous detection of lane markers improves road safety, and purely visual tracking is desirable for widespread vehicle compatibility and reducing sensor intrusion, cost, and energy consumption. However, visual approaches are often ineffective because of a number of factors, including but not limited to occlusion, poor weather conditions, and wear to the paint or other visual indicia on the road itself. The techniques described herein may improve visual lane detection approaches in drastically degraded visual conditions, and, at least in some cases, without relying on additional active sensors. In scenarios where visual lane detection algorithms are unable to detect lane markers, for instance, the proposed approach uses location information of the vehicle to locate and access alternate imagery of the road and attempts detection of the lane markers on this secondary image. Subsequently, by using a combination of one or more of feature-based alignment, pixel-based alignment, and partial 3-dimensional ("3D") scene reconstruction and reprojection, an estimated location of the lane marker may be found in the current scene. The techniques may enable navigation of both manually operated and autonomous transportation systems and may improve safety in poor visibility conditions or in other conditions where the lane markers may not be visually evident.

Figure 1:
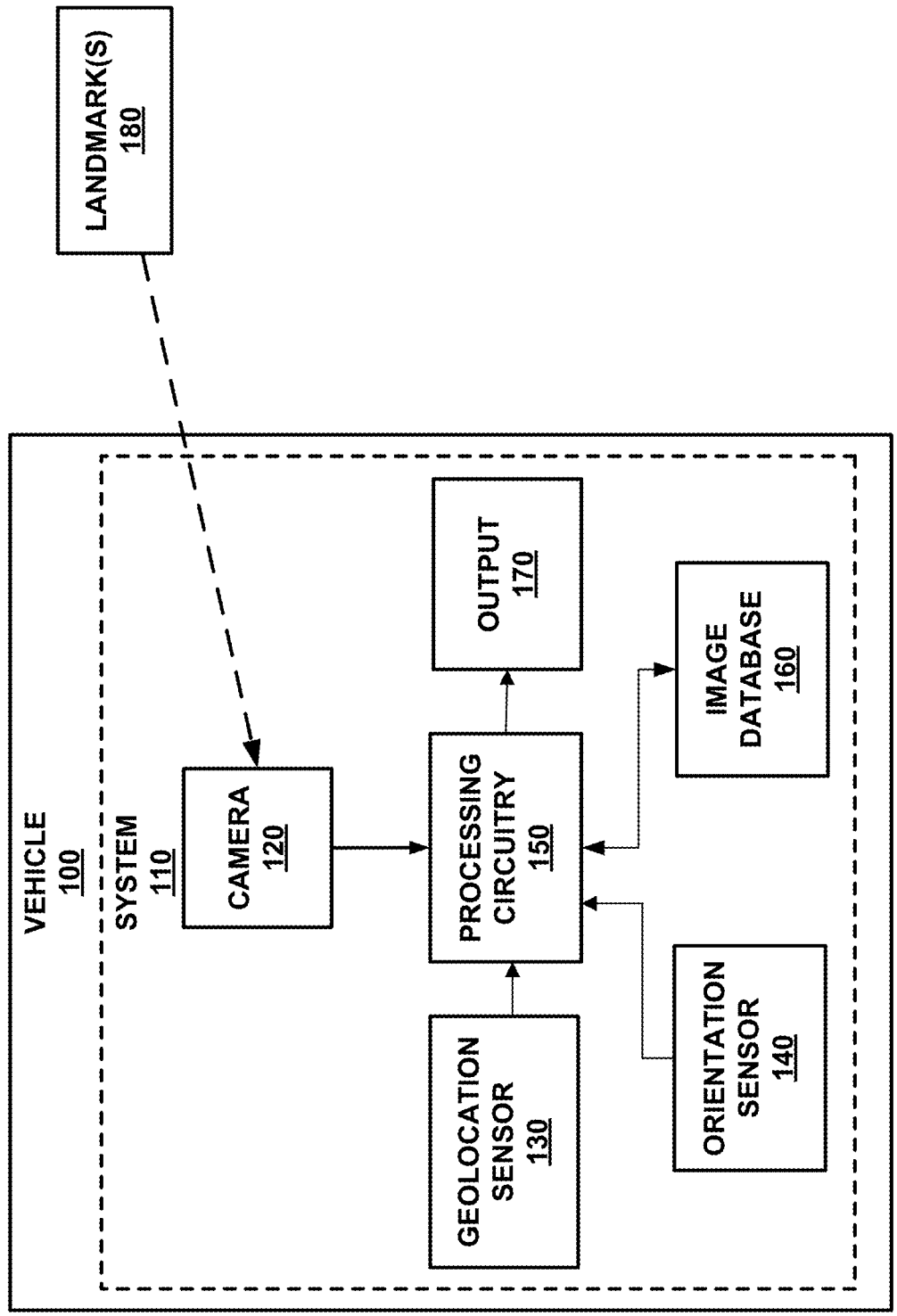
FIG. 1 is a block diagram depicting an example vehicle lane detection system, according to techniques of this disclosure.

FIG. 1 is a block diagram depicting an example vehicle lane detection system 110, according to techniques of this disclosure. System 110 may be used in conjunction with a vehicle 100, which represents an automobile, motorcycle, semi-truck, snow plow or other service vehicle, ATV, snowmobile, or other vehicle that uses roads for transport. In some examples, system 110 is operably connected to vehicle 100 and may be in communication with or incorporated into other devices within vehicle 100, such as a speaker system, a dashboard instrument panel, a rear-view or side panel mirror, a front or rear windshield apparatus, a center console system, or any other interface or viewing port within vehicle 100. In some examples, system 110 may be a standalone system that operates separately from the other devices within vehicle 100. In accordance with the techniques described herein, system 110 may be a smartphone, a tablet computer, a digital camera, or any other device that includes the information input devices described in FIG. 1. System 110, in the example of FIG. 1, has at least three information input devices: (1) camera 120, (2) geolocation sensor 130 configured to determine the location of the system, and (3) orientation sensor 140 configured to determine a physical orientation of camera 120.

Camera 120 represents a photo camera, video camera, or other image capture device and is configured to obtain a current or "live" image of the camera 120 surroundings, for example through a front windshield of vehicle 100, and send this at least one image to processing circuitry 150. Geolocation sensor 130 may determine an approximate physical location and pose (e.g., compass heading) of vehicle 100 and sends this location information to processing circuitry 150. Location information may be obtained and expressed as Global Positioning System (GPS) coordinates, a street or other address, and/or a location identifier, for instance. Geolocation sensor may represent or include a GPS receiver to obtain GPS coordinates from the GPS. Location information may also include a vehicle compass heading or other information describing an orientation or pose of vehicle 100. Orientation sensor 140 may determine an approximate physical orientation of camera 120 and sends this orientation information to processing circuitry 150. Orientation information may include data describing an azimuth, azimuth, polar coordinates, ordinal direction, a vector for an x, y, z axis, and/or other information describing an orientation of camera 120, e.g., with respect to a coordinate system. Orientation sensor 140 may include an inertial measurement unit (IMU) that determines the approximate physical orientation of camera 120.

Processing circuitry 150 obtains one or more candidate images from image database 160 based at least on the location information and orientation information. Image database 160 may be, for example, stored by a local memory device of system 110 (not shown) and accessible to the processing circuitry 150, or alternatively, a cloud-based or other remote storage system accessed through the internet or other network. Image database 160 stores images of physical scenes (hereinafter, "candidate images") captured by an image capture device at respective locations and according to respective orientations of the image capture device, which may or may not be camera 120. Image database 160 maps the locations and orientations to the respective candidate images. For example, image database 160 may include a table, map, or other associative data structure to map pairwise keys of location and orientation information to stored candidate images.

In some examples, system 110 sends the location information and the orientation information to a remote instance of image database 160 in a request for a corresponding one or more candidate images. Image database 160 may then, in response to receiving the location and orientation information, transmit back to processing circuitry 150 a set of candidate images captured at a geolocation and orientation similar to the geolocation and orientation indicated by the location information and orientation information received.

Processing circuitry 150 compares the current image captured by camera 120 to the one or more candidate images, received from image database 160, to select a first best-matched image from the collection of candidate images. For example, processing circuitry 150 may conduct a feature-matching process to identify one or more common elements, such as one or more landmarks 180, between the current image and each of the candidate image. Landmarks 180 may represent any image/scene features, such as buildings, foliage, roads, road markings, traffic signs and lights, statuary, signs, and so forth. Landmarks 180 optionally exclude features having a transient relationship to the captured scene, such as clouds, people, and animals. Processing circuitry 150 may, in some instances, objectively quantify the degree of similarity between any two images by producing a homography matrix.

In some instances, processing circuitry 150 may use similar techniques to also select a second best-matched image from the collection of candidate images. In such instances, processing circuitry 150 may further reconstruct a 3D model using the first best-matched image and the second best-matched image. The 3D model may be representative of the selected best-matched images, thereby at least partially digitally recreating the environment surrounding system 110 and vehicle 100. Processing circuitry 150 may then determine a geometric relationship between the 3D model and the current image.

Once processing circuitry 150 has identified at least a first best-matched image (or determined the geometric relationship in the instance where two best-matched images are selected), processing circuitry 150 may then attempt to determine a position of the vehicle lane in the current image, e.g., using image alignment against the selected best-matched image(s) and/or the geometric relationship between the 3D model and the current image. In this way, processing circuit 150 applies visual feature matching to approximately find the location of the lane in the current image, even under reduced or even zero lane visibility. Based on the position of the vehicle lane in the current image, the orientation of the camera 120, and the geolocation information for vehicle 100, system 110 may prompt adjustments to the vehicle 100 heading such that the vehicle remains safely within the confines of the lane on the current road.

In some cases, processing circuitry 150 may extract at least one roadway lane-line from the best-matched image and superimpose the lane line into a corresponding location on the current image. Processing circuitry 150 may send the resulting composite image to output 170 for further use in navigational assistance, such as for display on a screen, or for generating alerts, or for autonomously or semi-autonomously driving vehicle 100.

Figure 2:
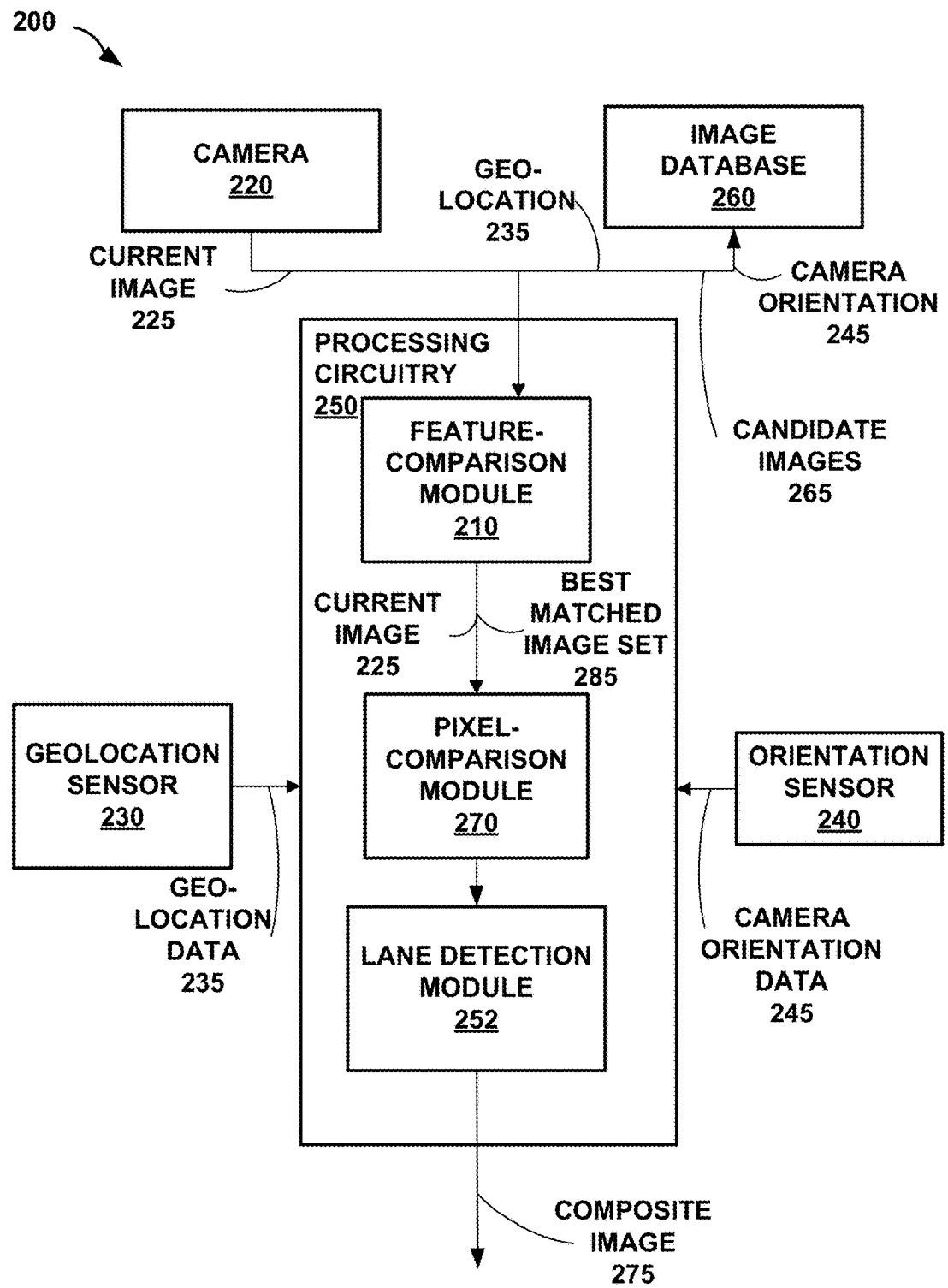
FIG. 2 is a block diagram depicting example internal components of an example vehicle lane detection system, according to techniques of this disclosure.

FIG. 2 is a block diagram depicting example internal components of an example vehicle lane detection system, according to techniques of this disclosure. Vehicle lane detection system 200 may represent an example instance of system 110 of FIG. 1. Processing circuitry 250 obtains geolocation data 235 from geolocation sensor 230. Geolocation data 235 may comprise at least an estimated longitude and an estimated latitude for the geolocation sensor and corresponds to the approximate current geolocation of camera 220. Elements of FIG. 2 may represent examples of similarly-named elements of FIG. 1.

Additionally, processing circuitry 250 obtains camera orientation data 245 from orientation sensor 240. Camera orientation data 245 may comprise at least a horizontal heading (i.e., a rotation about the vertical axis, or bearing) and a vertical pitch (i.e., a rotation about the horizontal axis that is perpendicular to the direction of the lens of camera 220, which may correspond to the direction of the motion of the vehicle), corresponding to the approximate current physical orientation of camera 220 with respect to a coordinate frame.

To correctly project the lane markers onto the current image, the proper image at the current location may be recovered from the database. Based on initial location data represented by geolocation data 235 and camera angle represented by camera orientation data 245, the techniques described herein may find the best-matched image in the database to the current image, or equivalently, optimally matching the location and camera angle combination. In the first step towards this goal, since latitude and longitude are highly correlated, processing circuitry 250 may undertake a grid search approach to find the closest latitude and longitude to the current vehicle location. Assuming the initial guess for the camera angle is close to the true value, with latitude and longitude getting closer to the true value, the current image and candidate image from image database 260 will have more common content.

After finding the closest location, the next step is to find the closest camera angle. The camera angle may include the heading (i.e. rotation around the vertical axis, or bearing) and pitch (i.e., rotation about the axis perpendicular to the direction of the motion). Under the assumption that initial pitch guess is close to the true value, when pitch is fixed, the more accurate the heading is, the more overlapped content there will be. A similar argument applies for the pitch angle. Thus, the optimal heading angle and the optimal pitch angles can be searched separately. To find the best heading and pitch angles, a binary search strategy may be adopted starting at an initial guess close to the actual angles, as obtained from orientation sensor 240. For example, with initial assumption of 150°, processing circuitry 250 may search for the optimal angle (either pitch or heading) between 145° and 155° using binary search.

Processing circuitry 250 may use geolocation data 235 and orientation data 245 to obtain one or more candidate images from image database 260. Image database 260 may represent an instance of image database 160 of FIG. 1. In some cases, if the current geolocation and orientation of camera 220 correspond to a frequently-traveled route by the user, system 200 may have locally stored a set of images taken during past trips by that same user on the same route. In such cases, image database 260 may be a local memory device. Alternatively or additionally, image database 260 may be a public, shared, cloud-based database, such as Google Street View™.

Image database 260 may then return to processing circuitry 250 a set of candidate images 265. Candidate images 265 represents one or more images previously (relative to the current operation and current image capture time) captured by an image capture device, which may be camera 220 or a different image capture device. Candidate images 265 may include a set of images that are each geo-tagged with geolocations that fall within the latitude range and longitude range from geolocation data 235, and that are also tagged with a physical orientation that falls within the heading range and pitch range from orientation data 245. In order to reduce download and upload time, processing circuitry 250 may retrieve not only images corresponding to current geolocation 235, but may also pre-retrieve images corresponding to a predicted future geolocation of system 200, based on the heading direction as indicated by orientation data 245. Alternatively or additionally, the future position of the system may be predicted by intercepting data from a guided GPS-navigation system once a preferred route has been selected by the user.

Also sent to processing circuitry 250 is at least one current image 225 captured by camera 220. Processing circuitry 250 may then begin to search for a best-matched image set 285 from the set of candidate images 265 that corresponds to current image 225. The best-matched image set may include a first best-matched image, and may also include a second best-matched image in some instances.

A first step in selecting best-matched image set 285 from the set of candidate images 265 may be conducted by a feature-comparison module 210, which may be configured to detect a unique set of features in current image 225, and to detect a unique set of features in the candidate images 265, and then to compare the two sets of features to evaluate their degree of similarity. Feature-comparison module 210 may use a criterion for measuring a degree of similarity between two images that is based on the number of matched feature points between the images. Although the current and candidate images may have very different appearances, identifying the candidate image with the maximally overlapped visual content with the current image may ensure the highest number of feature point matches for realistic scenes.

Feature-comparison module 210 may include, for example, a Harris & Stevens corner-detection algorithm. To ensure an even spatial distribution of feature points and improve the likelihood of finding the most accurate image match, feature-comparison module 210 may require that every detected point be at least a certain distance away from any other point, rather than retaining every point for analysis. The feature-comparison module 210 may then implement a "Oriented FAST and Rotated BRIEF" (ORB) feature-detector to extract a feature descriptor from both the current image 225 and the candidate images 265. Then, the best-matched image set 285 is selected from the candidate images 265 using a descriptor-matching algorithm, such as a "k-nearest-neighbors" (kNN) metric, to compare the descriptor from current image 225 to each of the descriptors from the candidate images 265.

In some examples, for each feature point in the current image, feature-comparison module 210 may pick up the two most similar points from a candidate image. If the matching distance of the most similar point is significantly smaller than that of the second-best point, (e.g., a minimum of 30 percent reduction in distance), the most similar point is regarded as a potential match. Ideally, matching from current image to candidate image will have an identical result as the matching from candidate image to current image. However, because of visual distortions and occlusions, these two results are not always identical.

Two additional steps may be conducted by feature-comparison module 210 to improve quality of image matching. First, the descriptor-matching algorithm may be run in reverse direction (i.e., from the candidate historical image to the current image) to remove inconsistent matches. Second, the "random sample consensus" (RANSAC) algorithm may be run to obtain an optimal homography matrix between current image 225 and any of candidate images 265. This may remove outlier candidate images 265. Since two images follow projective transformation, any pair of feature matches should also follow the same transformation. Therefore, those matches that do not follow the transformation are very likely to be outliers, and may be abandoned.

Once feature-comparison module 210 has selected a best-matched image set 285 from the candidate images 265, processing circuitry 250 may send best-matched image set 285 and current image 225 to pixel-comparison module 270 for precise image alignment. An initial step performed by pixel-comparison module 270 may be to filter out uncommon elements between current image 225 and best-matched historical image 285. Uncommon elements may be caused by, for example, time-varying features such as cars, or photometric distortion including different pixel-intensity values due to differences in lighting. An uncommon-elements filter may be created by applying a "window" around each point on the best-matched image set 285 that was matched by the feature-comparison module 210. The collection of windows forms a filter, in which any pixel of best-matched image set 285 that does not fall within one of the "windows" is removed.

Pixel-comparison module 270 may then run a pixel-based matching algorithm, such as the "Enhanced Correlation Coefficient Maximization" (ECC) algorithm. ECC accepts an input "mask" defining a subset of pixels as a region of interest. In this application, the previously constructed "window" filter may function as that mask. For analysis, the ECC outputs a refined homography matrix mapping from the best-matched image set 285 from image database 260 to the current image 225.

In general, the homography matrix obtained after running RANSAC on feature-based matches may not be accurate, especially when the feature matches are not spatially evenly distributed. For example, if most feature matches are located on the left half of the image, applying feature-based matching will project the markers on the left-half of the image accurately; however, the projections on the right-half will exhibit large discrepancies (see FIG. 9C for an example). Depending on the scene, the spatial distribution of feature matches may be heavily skewed. To further optimize the result, pixel-comparison module 270 is executed by processing circuitry 250 to apply pixel-based matching after feature matching by feature-comparison module 210.

However, there are two challenges when applying pixel-based matching. The first challenge, as the best-matched image from the database was taken at a prior time, it will almost certainly contain different objects (e.g., cars, pedestrians, construction equipment). To accurately align the best-matched image using pixel-based matching, such content may be ignored, and only common content shared by two images should be considered. Another challenge arises from photometric distortion. One object might have different pixel intensity values in images taken in different time (e.g., higher intensity during a sunny day than a cloudy day).

Figure 7:
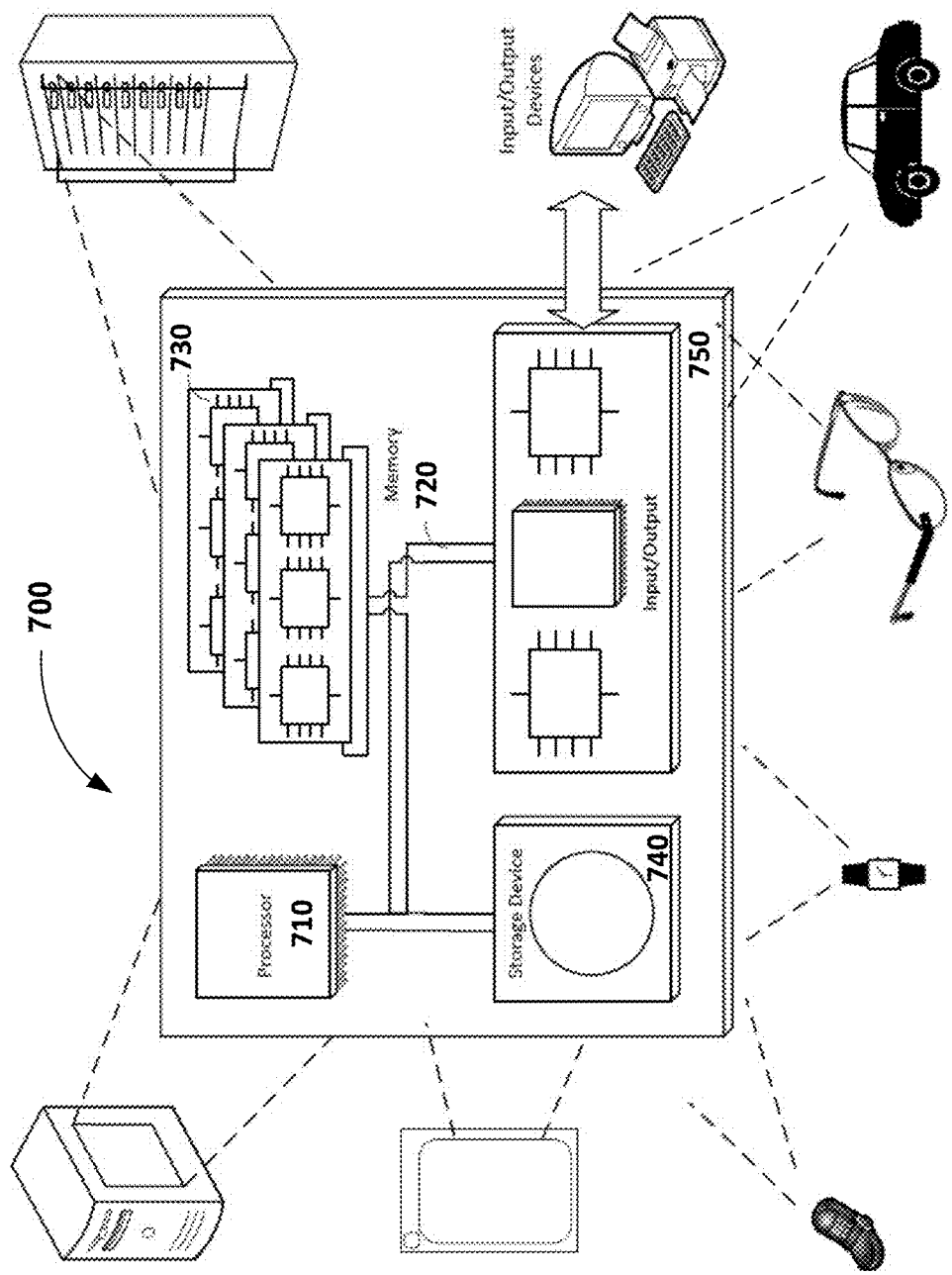
FIG. 7 is a block diagram illustrating an example computing device, according to techniques of this disclosure.

To extract common content between the best-matched image and current image, feature-comparison module 210 may first apply feature-based matching to find common points between two images, then a window centered at each matched point on the best-matched image may be extracted (since the transformation from the best-matched image to current image is being sought). These windows are put together to form a filter, which filters out uncommon content between the images. One example is shown in FIG. 7. Since the best-matched image has the largest number of matched points among all candidate images in database, it will maximize the number of "common" pixels for pixel-based matching by pixel-comparison module 270.

As noted above, the pixel-matching algorithm, e.g., ECC, outputs a refined homography matrix mapping from the best-matched image set 285 from image database 260 to the current image 225.

In some cases, the vehicle lane detection system 200 reconstructs a sparse 3-dimensional (3D) model of the vehicle surroundings at the current location of the vehicle using the candidate images 265. By then estimating the geometric relationship between the 3D model and the current view, as represented by current image 225, vehicle lane detection system 200 detects the vehicle lanes and may project lane markers onto the current image 225 to generate composite image 275.

In such cases, to obtain alternate images for 3D reconstruction, the vehicle lane detection system 200 obtains the most similar images in database as described above. For search optimization, images are indexed in the image database 260 by location, to improve search accuracy, as well as to reduce the number of possible images to be matched. The criterion used to measure similarity between two images may be based on the number of matched feature points. True similarity is not necessarily the intent, as the current and candidate images may have very different appearances. The intent is to find two images with maximally overlapped visual content, which will essentially ensure the highest number of feature point matches for realistic scenes.

Feature points may be detected using Harris corner detector. Instead of keeping every feature point, feature-comparison module 210 may force the final feature point to be at least a certain distance away from any other feature point.

This is to ensure an even spatial distribution of feature points to improve the likelihood of finding the most accurate image match. ORB feature descriptor is used to extract feature descriptors from both current image and candidate image, and match between them. To ensure an accurate match, descriptor matching may be run in both direction between current image and candidate image to further remove inconsistent matches.

After matching features on all possible candidate images 265 at the current location, two images with the most-matched points may be included in best-matched image set 285 for 3D reconstruction. For 3D reconstruction, generally two images should be selected from candidate images 265. A higher number of images improves the quality of the 3D street model; however, as the focus is not on the 3D reconstruction itself, the vehicle lane detection system 200 may select and use two images to reduce the computing load. In some examples, the vehicle lane detection system 200 may refine the 3D model using more candidate images to more accurately depict the lane marker projection, including in examples where processing circuitry 250 is advanced and able to consistently update the 3D model in real time. As such, full 3D reconstruction may be used when processing circuitry 250 has adequate specifications to handle the heavier processing of full 3D reconstruction.

In examples in which sparse 3D reconstruction is used, in order to obtain the geometric relationship between the 3D street model and current view, instead of full 3D reconstruction, the vehicle lane detection system 200 may reconstruct the sparse 3D street model with feature points only, which is sufficient for camera registration. To generate the 3D points needed for sparse 3D street model reconstruction, the vehicle lane detection system 200 may estimate the relative pose between the two images (the "image pair"). The vehicle lane detection system 200 may then match features between the image pair, and then use the correspondences to calculate the fundamental matrix between the two images. Subsequently, the vehicle lane detection system 200 recovers the rotation matrix and translation vector between the image pair from the fundamental matrix and camera intrinsic parameters. Additional details are included in the appendix.

Once the best-matched image 285 from the image database 260 for current image 225 has been identified, lane detection module 252 may extract visible lane markers (alternatively, "lane lines") from best-matched image 285 and transpose them into corresponding pixel locations of current image 225. Lane markers may be detected in best-matched image 285 in at least two steps. First, because lane markers are typically either white or yellow, pixels of any other hues are removed using a color-based segmentation algorithm. In some examples, only white pixels whose RGB value ranges from (180, 180, 190) to (255, 255, 255), and only yellow pixels whose RGB value ranges from (0, 150, 170) to (150, 255, 255), are retained.

After only white and yellow pixels remain, a line-detection algorithm, such as a Canny line detector, may be applied to the remaining pixels. Any outlying pixels that do not conform to a clear boundary may be eliminated. Once the lane lines have been detected in the best-matched image 285, they may then be transposed onto current image 255, by using the homography matrix that was previously calculated by the pixel-based matching algorithm to determine a corresponding location within current image 255.

Processing circuitry 250 may output a composite image 275 comprising current image 255 with the extracted lane lines superimposed into their corresponding locations on current image 255. Composite image 275 may be output for display to a display device, such as a smartphone screen or heads-up display screen.

Processing circuitry 250 may alternatively, or additionally, approximate the vehicle's distance from the lane line using best-matched image 285 and current image 225. Processing circuitry 250 may be configured to generate an alert to the user if the vehicle becomes either too close to or too far from the detected lane line. Where a vehicle is fully or partially automated, processing circuitry 250 may be configured to output signals for automatically steering the vehicle if the vehicle becomes either too close to or too far from the detected lane line.

In order to assist the vehicle operator in navigating the vehicle, system 200 may be configured to repeat the process described herein at various intervals such that the at least one indication of the location of the vehicle lane shows an accurate and present lane projection while the vehicle moves through the environment. In some instances, the interval may be dependent on the visibility conditions present at the time (e.g., in lower visibility conditions, the interval may be shorter). In other instances, the interval may be such that system 200, in essence, provides real-time projections of the vehicle lane in an augmented reality output as the vehicle moves through the environment.

Figure 3:
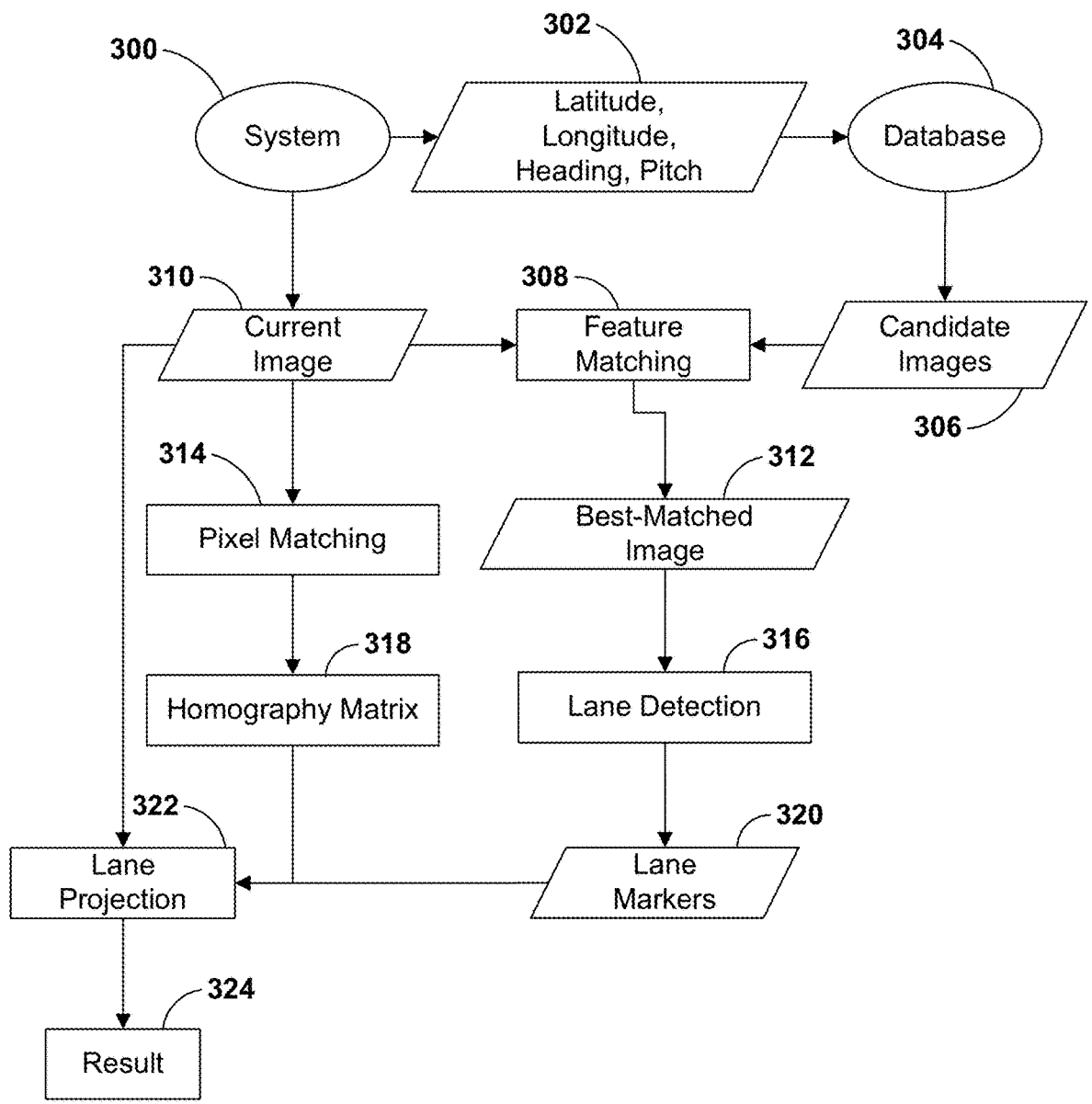
FIG. 3 is a conceptual diagram depicting an example process for detecting vehicle lane lines, which may in some cases be implemented in a smartphone application, according to techniques of this disclosure.

FIG. 3 is a conceptual diagram depicting an example process for detecting vehicle lane lines, which may in some cases be implemented in a smartphone application, according to techniques of this disclosure. This conceptual diagram is described with respect to operations performed by a vehicle lane detection system 300, which may be implemented by a computing system or computing device, such as an in-vehicle computing system, a smartphone, a GPS navigation system, and a laptop computer.

Vehicle lane detection system 300 sends at least four data values 302, representing at least a latitude, longitude, a heading, and a pitch, to image database 304. In response, image database 304 returns a set of candidate images 306 captured according to approximately the values as the four data values 302.

Simultaneously, an image capture device built into vehicle lane detection system 300 takes a photograph consisting of current image 310 depicting the surrounding landscape. Vehicle lane detection system 300 may then begin a feature-matching process 308 in which current image 310 is compared to each of candidate images 306 in order to identify and select a first best-matched image 312 from candidate images 306.

Best-matched image 312 may then be further compared to current image 310 during pixel-matching process 314 in order to precisely align the common features of the two images. Pixel matching 314 results in the creation of refined homography matrix 318 mapping from best-matched image 312 onto current image 310.

Vehicle lane detection system 300 may apply a lane-detection process 316 to best-matched image 312 in order to identify and extract any pixels representative of roadway lane lines, for example, by using deleting all but yellow and white pixels, and then running the remaining pixels through a line-detection algorithm. The result of lane-detection process 316 is a set of lane markers 320, which vehicle lane detection system 300 may project onto current image 310 during lane projection process 322 by using homography matrix 318 as a guide indicating a corresponding lane location on current image 310. Lane projection process 322 results in a composite image 324 that may be output for further use in navigation, such as on a visual display, to generate navigation alerts, or to guide an autonomous vehicle.

Figure 4:
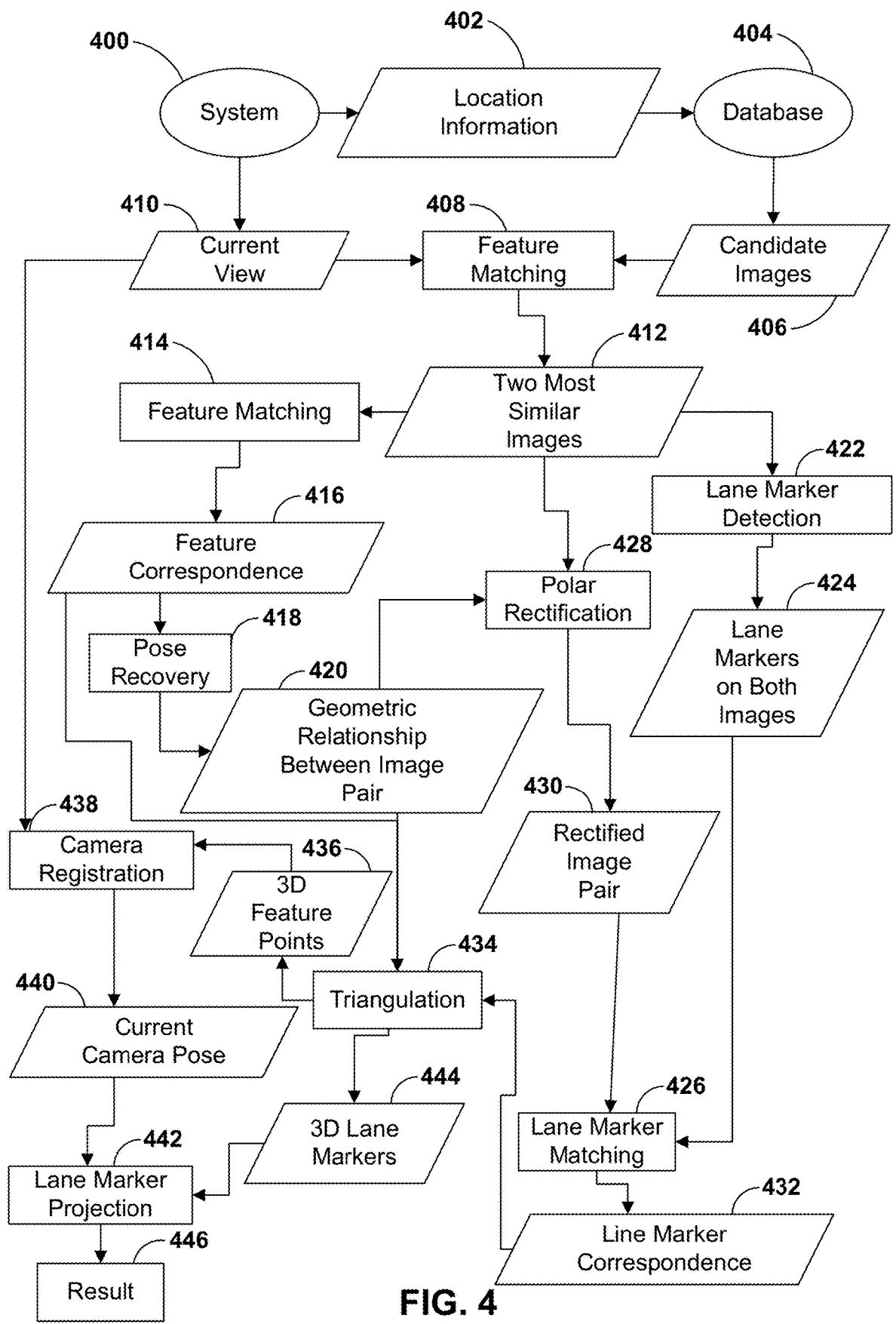
FIG. 4 is a conceptual diagram depicting an example process for detecting vehicle lane lines, which may in some cases be implemented in a smartphone application, according to techniques of this disclosure.

FIG. 4 is a conceptual diagram depicting an example process for detecting vehicle lane lines, which may in some cases be implemented in a smartphone application, according to techniques of this disclosure. This conceptual diagram is described with respect to operations performed by a vehicle lane detection system 400, which may be implemented by a computing system or computing device, such as an in-vehicle computing system, a smartphone, a GPS navigation system, and a laptop computer.

The conceptual diagram may be implemented by one or more applications executed by a vehicle lane detection system. In order to get the alternate images for 3D reconstruction, the vehicle lane detection system may search for the most similar images in database 404. For search optimization, the vehicle lane detection system may index images in the database 404 by their location 402, to improve search accuracy, as well as to reduce the number of possible images to be matched. For the purposes of this disclosure, the criterion used to measure similarity between two images may be based on the number of matched feature points 408. This is because true similarity may not be needed, as the current and candidate images may have very different appearances. The intent is to find two images with maximally overlapped visual content, which may ensure the highest number of feature point matches for realistic scenes. Feature points may be detected using Harris corner detector. Instead of keeping every feature point, the vehicle lane detection system may force the final feature point to be at least a certain distance away from any other feature point. This is to ensure an even spatial distribution of feature points to improve the likelihood of finding the most accurate image match. ORB feature descriptor is used to extract feature descriptors from both current image and candidate image, and match between them. To ensure an accurate match, descriptor matching may be run in both directions between current the image and the candidate image to further remove inconsistent matches.

After matching features on all possible candidate images at current location, two images with the most-matched points may be chosen for 3D reconstruction (412). For 3D reconstruction, two images should be selected from the image database. A higher number of images improves the quality of the 3D street model; however, as the focus may not be on the 3D reconstruction itself, only two images may be used to reduce the computing load if the vehicle lane detection system is unable to efficiently process full 3D reconstruction.

Since the techniques described herein may derive the geometric relationship 420 between the 3D street model and current view 410, instead of full 3D reconstruction, the vehicle lane detection system may build a sparse 3D street model with feature points only, which may be sufficient for camera registration. To generate the 3D points needed for sparse 3D street model reconstruction, the vehicle lane detection system may estimate the relative pose between the two images. The vehicle lane detection system may match features between the image pair, then use the correspondences to calculate the fundamental matrix between the two images. Subsequently, the rotation matrix and translation vector between the image pair may be recovered from the fundamental matrix and camera intrinsic parameters (418). The translation vector is up to scale. Assume the scale is $\lambda$, then the generated 3D point is $\lambda$ (x, y, z), where (x, y, z) is the real position of this point in world coordinate. When registering current view 410, the current camera pose will be [R, $\lambda$t], compared to the real current camera pose [R, t], where R is rotation matrix and t is translation vector. As a result, the transformed point in current camera frame before projection will be: $[R, \lambda t][\lambda x, \lambda y, \lambda z, 1]^T = \lambda[R, t][x, y, z, 1]^T$. Since the techniques described herein are using pinhole camera model, the scale factor is eventually eliminated.

Based on the rotation matrix and translation vector, 2D feature correspondences 416 are triangulated to get 3D points in the following manner: To solve for each 3D feature point X, use K to represent the camera intrinsic parameters, and $[R_i \, t_i]$ to represent the pose of the $i^{th}$ camera in world coordinates. For feature $u_1$ in the first image:

$$\lambda_1 u_1 = K[R_1, t_1]X$$

$$u_1 \times \lambda u_1 = u_1 \times K[R_1, t_1]X$$

$$0 = [u_1 \times K[R_1, t_1]]X$$

Similarly, for its corresponding $u_2$ the second image:

$$[u_2 \times K[R_2, t_2]]X = 0$$

By stacking the two together, the techniques described herein derive:

$$\begin{bmatrix} u_1 \times K[R_1, t_1] \\ u_2 \times K[R_2, t_2] \end{bmatrix} X = 0$$

To obtain the value of X, the null space of the above equation is solved.

As lane markers 424 may be lines, it may not be possible to match them directly between the image pair, and thus their locations cannot be triangulated in the same manner. As such, the vehicle lane detection system may first detect pixels which belong to lane markers on both images, then match them between the rectified image pair (426).

The strategy of lane marker detection (426) is based on color histogram and the Canny edge detection algorithm. For each image, the vehicle lane detection system may extract yellow or white pixels based on their pixel value, since most lane markers in U.S. traffic system are of these two colors. To make it robust to illumination changes, the vehicle lane detection system may convert image from RGB to HSV color space. At the same time, the vehicle lane detection system may run Canny edge detection to extract the edges on the image. Finally, the vehicle lane detection system may take the intersection of yellow/white pixels and edges on the image.

The vehicle lane detection system may use the fundamental matrix computed in the previous step to rectify the image pair for triangulation 434. Since vehicles are predominantly forward moving, if the vehicle lane detection system uses classic stereo rectification, most of the information on the original image will disappear from the rectified image because camera is rotated almost 90. To prevent this, the vehicle lane detection system may rectify the image pair in polar coordinates around epipole. The vertical axis of the rectified image is the polar angle around epipole, and the horizontal axis is the distance to epipole. Polar rectification preserves every pixel from the original image, for camera movement in any arbitrary direction. In order to match lane marker pixels on rectified image, the vehicle lane detection system may first transform these lane marker pixels from the image pair to polar coordinates based on polar rectification. Consequently, each lane marker pixel from one image should lie on the same horizontal line as its corresponding pixel from the other image, because the pixels share the same angle with respect to epipole. As a result, the search space is reduced to one dimension only, which may significantly speed up the searching process. Furthermore, only those lane maker pixels that are likely to be the correspondence may be checked, which reduces the search space further. Currently, the vehicle lane detection system may compute a descriptor for each pixel and compare it with the descriptors of those lane marker pixels in the other image that lie on the same horizontal line. After getting lane marker pixel correspondence on the polar coordinates, the vehicle lane detection system may transform the pixels back to Cartesian coordinate, and triangulate the pixels using the same method as the feature point triangulation.

After building a 3D street model that consists of feature points and lane marker points, the next step is to register current view 410 with respect to the reconstructed 3D street model (438). The vehicle lane detection system may take the descriptors of each feature points from the database images and match them against the feature descriptors from current view 410. After that, 3D to 2D correspondence is derived, based on which, the vehicle lane detection system may solve the Perspective-N-Point (PNP) problem to get the relative pose of current camera with respect to the 3D model (440). After multiplying the camera intrinsic parameter with the relative pose to get the projection matrix, the vehicle lane detection system may project the lane markers in 3D model onto the current view 410 (442), so that the driver is able to see the projected lane markers 444 through the smartphone or other display device (446).

Figure 5:
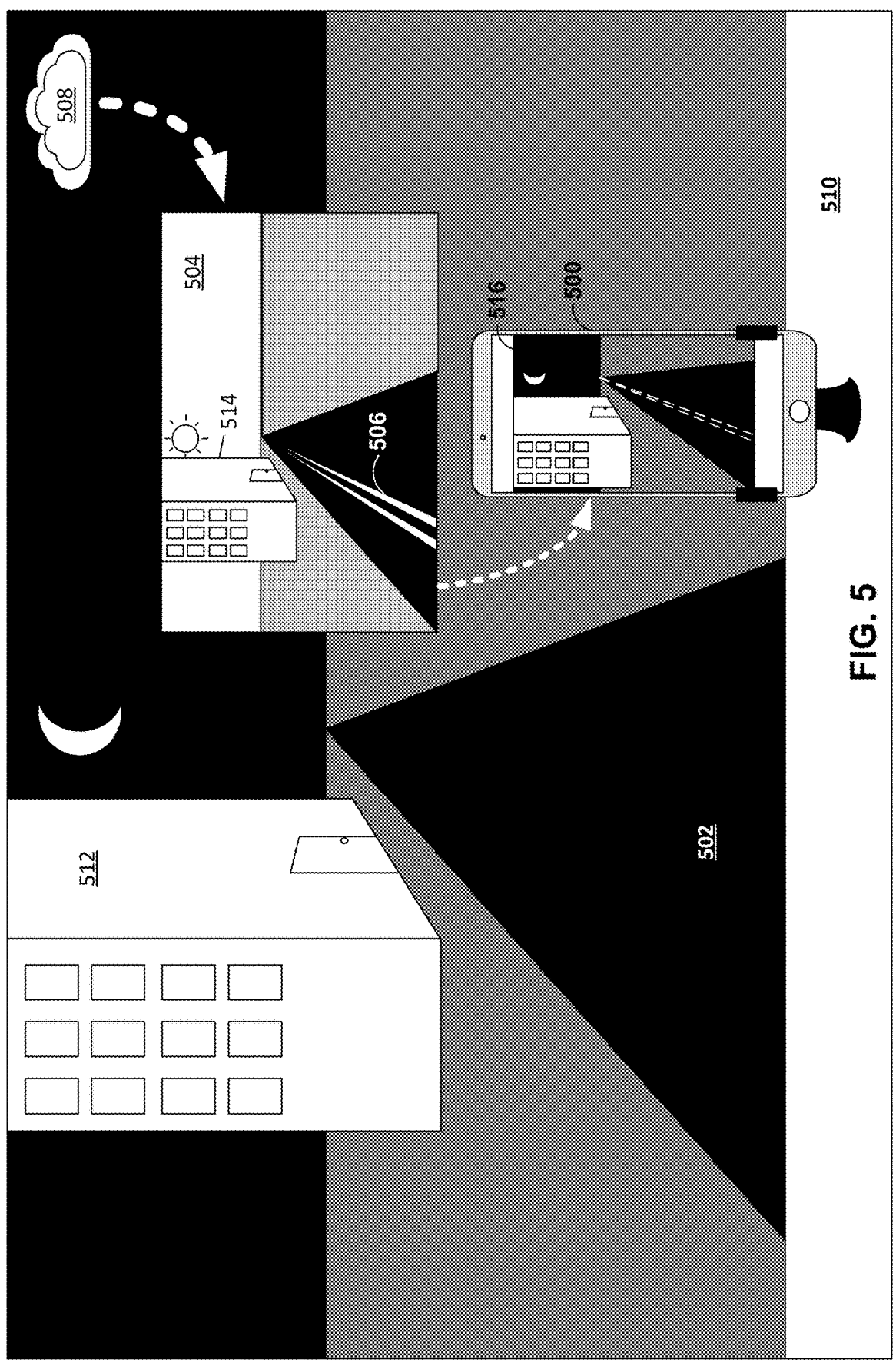
FIG. 5 is an example implementation of a vehicle lane detection system, which may in some cases be implemented in a smartphone application, according to techniques of this disclosure.

FIG. 5 is an example implementation of a vehicle lane detection system, which may in some cases be implemented in a smartphone application, according to techniques of this disclosure. In this example, the system is configured for use as a smartphone application on mobile computing device 500. In other examples, the vehicle lane detection system may be implemented using one or more devices, such as a GPS device and image capture device (e.g., a camera) coupled to a computing device. Roadway 502 is an unlit roadway whose lane lines are not currently visible due to low lighting conditions. Mobile computing device 500 is mounted on the dashboard 510 of a vehicle. The rear-facing camera of mobile computing device 500 captures a current image of the scenery in front of the vehicle according to the vehicle orientation. Meanwhile, the internal GPS of smartphone 500 and the internal orientation system of mobile computing device 500 send geolocation data and orientation data to cloud-based image database 508. In response, cloud-based image database 508 returns a set of historical imagery including candidate images captured near that same geolocation and oriented in approximately the same direction. The processor of mobile computing device 500 compares the current image to the set of candidate images to identify similar features, including landmarks. The processor of mobile computing device 500 identifies features of building 512 corresponding to features of building 514 as depicted in candidate image 504 and selects image 504 as the best-matched image. In some instances, such when mobile computing device 500 reconstructs a 3D model to determine a geometric relationship between the 3D model and the current image, a second best-matched image may also be selected. The processor of mobile computing device 500 conducts pixel-matching to align common elements of the current image with image 504. Next, the processor of mobile computing device 500 detects lane lines 506 within image 504 and transposes them on to the current image, creating composite image 516. Finally, the composite image is output from the processor, in this example output to the screen of mobile computing device 500 for use as a visual display. It should be noted that the system described herein is not exclusively configured for use in a smartphone or other mobile computing device. In an alternative embodiment, the system may be a fully-self-contained apparatus. Alternatively, the system may be incorporated into a vehicle at the factory, using sensors and components built directly into the vehicle. Composite image 516 may be output for display to a heads-up display, for instance.

Figure 6:
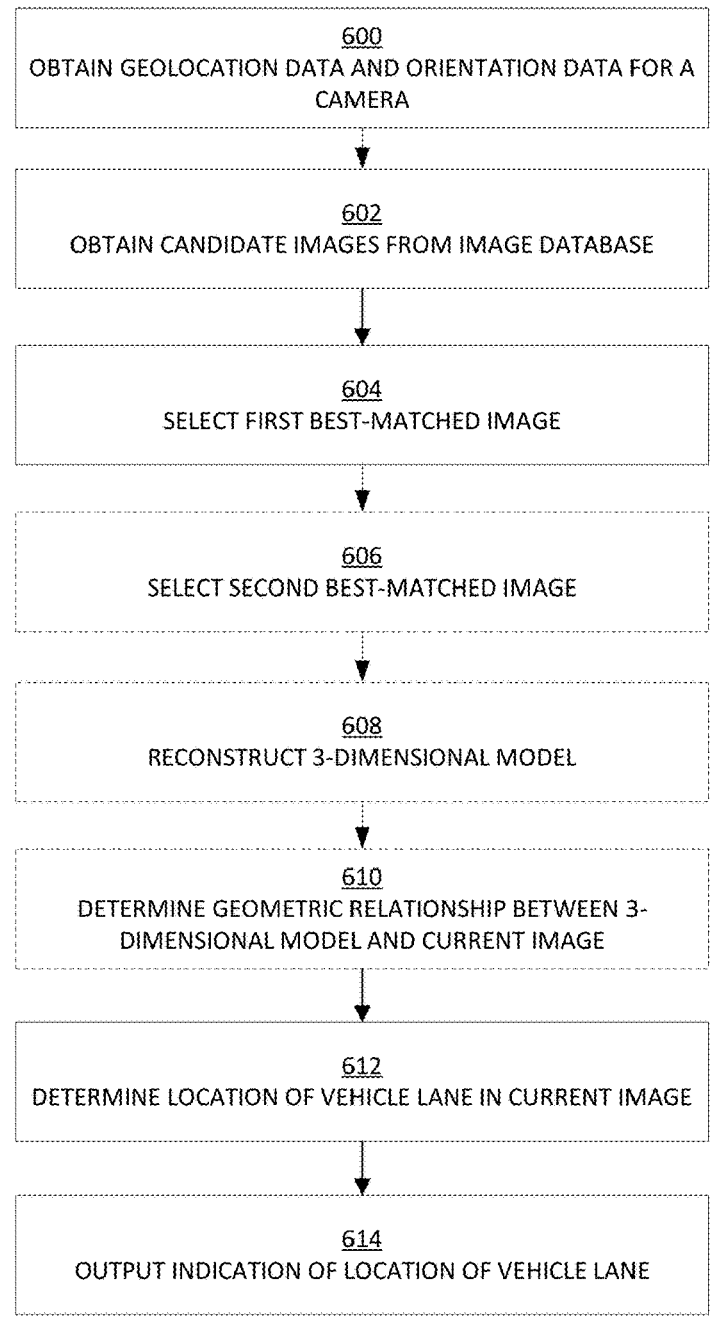
FIG. 6 is a flow diagram depicting an example process for detecting vehicle lanes, according to techniques of this disclosure.

FIG. 6 is a flow diagram depicting an example method for detecting vehicle lane lines near a current location. A system obtains current geolocation data (e.g., longitude and latitude), as well as orientation data (e.g., horizontal and vertical orientation angles), for a camera (600). The system also obtains one or more candidate images from an image database based at least on the geolocation data and the orientation data (602). The system selects a first best-matched image for the current image from the one or more candidate images (604). Optionally, the system may also select a second best-matched image from the one or more candidate images (606). If a second best-matched image is also selected, the system reconstructs a 3-dimensional model using the first best-matched image and the second best-matched image (608) and determines a geometric relationship between the 3-dimensional model and the current image (610). The system determines a location of a vehicle lane in the current image based on at least one lane marker visible in the best-matched image (612). If the second best-matched image is also selected, the system also determines the location of the vehicle lane based on at least one marker in the second best-matched image, and the geometric relationship between the 3-dimensional model and the current image. The system outputs at least one indication of the location of the vehicle lane (614). This indication may then be used to assist in vehicular navigation.

Various examples of images that may be used in the lane detection techniques described herein are described in U.S. Provisional Application No. 62/555,583, filed Sep. 7, 2017, which this application claims priority to and which is herein incorporated by reference in its entirety. For instance, FIGS. 6-9 of the above provisional application show examples of such figures.

FIG. 7 is an illustration depicting a detailed example of various devices that may be configured to implement some embodiments in accordance with the current disclosure. For example, device 700 may be a computing device, a vehicle, a robot, mobile sensing platform, a mobile phone or other mobile computing device, a wearable device such as a smartphone or smart watch, a vehicle, a workstation, a computing center, and/or a cluster of servers or other example embodiments of device, centrally located or distributed, capable of executing the techniques described herein. Any or all of the devices may, for example, implement portions of the techniques described herein for vehicle lane detection systems.

In this example, a device 700 includes a hardware-based processor 710 that may be implemented within a vehicle lane detection system or any device to execute program instructions or software, causing the computer to perform various methods or tasks, such as performing the techniques described herein. Processor 710 may be a general-purpose processor, a digital signal processor (DSP), a core processor within an Application Specific Integrated Circuit (ASIC) and the like. Processor 710 is coupled via bus 720 to a memory 730, which is used to store information such as program instructions and other data while the computer is in operation. A storage device 740, such as a hard disk drive, nonvolatile memory, or other non-transient storage device stores information such as program instructions, data files of the multidimensional data and the reduced data set, and other information. As another example, device 700 may provide an operating environment for execution of one or more virtual machines that, in turn, provide an execution environment for software for implementing the techniques described herein.

Device 700 also includes various input-output elements 750, including parallel or serial ports, USB, micro-USB, Firewire, or IEEE 1394, Ethernet, and other such ports to connect to the computer to an external device such as a display, camera, sensor, or the like. Other input-output elements include wireless communication interfaces such as Bluetooth, Wi-Fi, and cellular data networks.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable medium encoded with instructions. Instructions embedded or encoded in an article of manufacture including a computer-readable medium encoded, may cause one or more programmable processors, or other processors, to implement one or more of the techniques described herein, such as when instructions included or encoded in the computer-readable medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

What is claimed is:

1. A vehicle lane detection system, comprising:
   a camera configured to obtain a current image;
   an orientation sensor configured to obtain orientation data describing an orientation of the camera;
   a geolocation sensor configured to obtain geolocation data describing a location of the camera; and
   at least one processor configured to:
      obtain one or more candidate images from an image database based at least one of the geolocation data and the orientation data;
      select a best-matched image for the current image from the one or more candidate images;
      determine a location of at least one lane marker visible in the best-matched image;
      determine a corresponding location of a vehicle lane in the current image based on the location of the at least one lane marker visible in the best-matched image; and
      output at least one indication of the location of the vehicle lane based on the corresponding location of the vehicle lane in the current image.

2. The system of claim 1, wherein the best-matched image comprises a first best-matched image, and wherein the at least one processor is further configured to:
   select a second best-matched image for the current image from the one or more candidate images;
   reconstruct a 3-dimensional model using the first best-matched image and the second best-matched image; and
   determine a geometric relationship between the 3-dimensional model and the current image,
   wherein, to determine the corresponding location of the vehicle lane in the current image, the at least one processor is configured to determine the corresponding location of the vehicle lane in the current image based on the location of the at least one marker visible in the first best-matched image, at least one marker visible in the second best-matched image, and the geometric relationship between the 3-dimensional model and the current image.

3. The system of claim 1, wherein to output the at least one indication of the location of the vehicle lane the at least one processor is configured to:
   project, based at least on one or more of a lane marker identified in the best-matched image or the location of the vehicle lane in the current image, at least one lane marker to the location in the current image to create a composite image; and
   output, for display by a display device, the composite image.

4. The system of claim 1, wherein the at least one processor is further configured to:
   detect matching feature points present in the current image and each image from the one or more candidate images; and
   select the best-matched image from the one or more candidate images having a maximum number of matching feature points with the current image.

5. The system of claim 1, wherein the at least one processor is further configured to:
   compute a homography matrix for the best-matched image and the current image.

6. The system of claim 1, wherein the at least one processor is further configured to:

detect matching feature points present in the current image and each image from the one or more candidate images;
select the best-matched image from the one or more candidate images having a maximum number of matching feature points with the current image; and
apply a pixel-based matching algorithm to compute a homography matrix mapping from the best-matched image with the current image.

7. The system of claim 6, wherein the at least one processor is further configured to:
identify the at least one lane marker visible in the best-matched image; and
determine the corresponding location of the vehicle lane in the current image by projecting the at least one lane marker onto the current image using the homography matrix.

8. The system of claim 1, wherein to identify the at least one lane marker the at least one processor is configured to:
apply a color-based segmentation algorithm to the best-matched image to define a set of remaining pixels; and
apply a line detection algorithm to the set of remaining pixels to identify the at least one lane marker visible in the best matched image.

9. The system of claim 1, wherein the at least one processor is configured to:
detect, using a corner-detection algorithm, matching feature points present in the current image and each image of the one or more candidate images; and
select the best-matched image from the one or more candidate images having a maximum number of matching feature points with the current image.

10. The system of claim 9, wherein the at least one processor is configured to:
extract feature descriptors for the feature points present from the current image and each image from the one or more candidate images; and
detect the matching features points by applying a k-nearest-neighbors metric to the feature descriptions.

11. The system of claim 1, wherein to output the at least one indication of the location of the vehicle lane the at least one processor is configured to:
calculate, using the current image, an approximate distance between the system and the location of the vehicle lane in the current image; and
output, in response to a determination that the approximate distance is not an appropriate distance, an alert.

12. The system of claim 1, wherein to output the at least one indication of the location of the vehicle lane the at least one processor is configured to:
automatically navigate a vehicle based on the location of the vehicle lane in the current image.

13. The system of claim 1, further comprising:
a storage device to store the image database.

14. The system of claim 1, wherein the image database is stored at a remote computing device.

15. A method of vehicle lane detection, comprising:
obtaining, by a computing system, orientation data describing an orientation of the camera and geolocation data describing a location of the camera;
selecting, from one or more candidate images from an image database and based at least on the orientation data and the geolocation data, a best-matched image for a current image captured by the camera;
determining a location of at least one lane marker visible in the best-matched image;
determining a corresponding location of a vehicle lane in the current image based on the location of the at least one lane marker visible in the best-matched image; and
outputting, by the computing system, at least one indication of the location of the vehicle lane based on the corresponding location of the vehicle lane in the current image.

16. The method of claim 15, wherein the best-matched image comprises a first best-matched image, and wherein the method further comprises:
selecting a second best-matched image for the current image from the one or more candidate images;
reconstructing a 3-dimensional model using the first best-matched image and the second best-matched image; and
determining a geometric relationship between the 3-dimensional model and the current image,
wherein determining the corresponding location of the vehicle lane in the current image comprises determining the corresponding location of the vehicle lane in the current image based on the location of the at least one marker visible in the first best-matched image, at least one marker visible in the second best-matched image, and the geometric relationship between the 3-dimensional model and the current image.

17. The method of claim 15, wherein outputting the at least one indication of the location of the vehicle lane comprises:
projecting, based at least on one or more of a lane marker identified in the best-matched image or the location of the vehicle lane in the current image, at least one lane marker to the location in the current image to create a composite image; and
outputting, for display by a display device, the composite image.

18. The method of claim 15, further comprising:
extracting feature descriptors for the feature points present from the current image and each image from the one or more candidate images;
detecting, using a corner-detection algorithm, matching feature points present in the current image and each image of the one or more candidate images by applying a k-nearest-neighbors metric to the feature descriptions; and
selecting the best-matched image from the one or more candidate images having a maximum number of matching feature points with the current image.

19. A non-transitory computer-readable storage medium with instructions stored thereon that, when executed by at least one processor, cause the at least one processor to:
obtain orientation data describing an orientation of a camera and geolocation data describing a location of the camera;
select, from one or more candidate images from an image database and based at least on the orientation data and the geolocation data, a best-matched image for a current image captured by the camera;
determine a location of at least one lane marker visible in the best-matched image;
determine a corresponding location of a vehicle lane in the current image based on the location of the at least one lane marker visible in the best-matched image; and
output at least one indication of the location of the vehicle lane based on the corresponding location of the vehicle lane in the current image.

20. The non-transitory computer-readable storage medium of claim 19, wherein the best-matched image comprises a first best-matched image, and wherein the instructions further cause the at least one processor to:
- select a second best-matched image for the current image from the one or more candidate images;
- reconstruct a 3-dimensional model using the first best-matched image and the second best-matched image; and
- determine a geometric relationship between the 3-dimensional model and the current image,
- wherein, to determine the location of the vehicle lane in the current image, the instructions cause the at least one processor to determine the location of the vehicle lane in the current image based on the at least one marker visible in the first best-matched image, at least one marker in the second best-matched image, and the geometric relationship between the 3-dimensional model and the current image.

* * * * *